J. MAGEE.
Coffee Pot.
No. 27,371. 
Patented March 6, 1860.
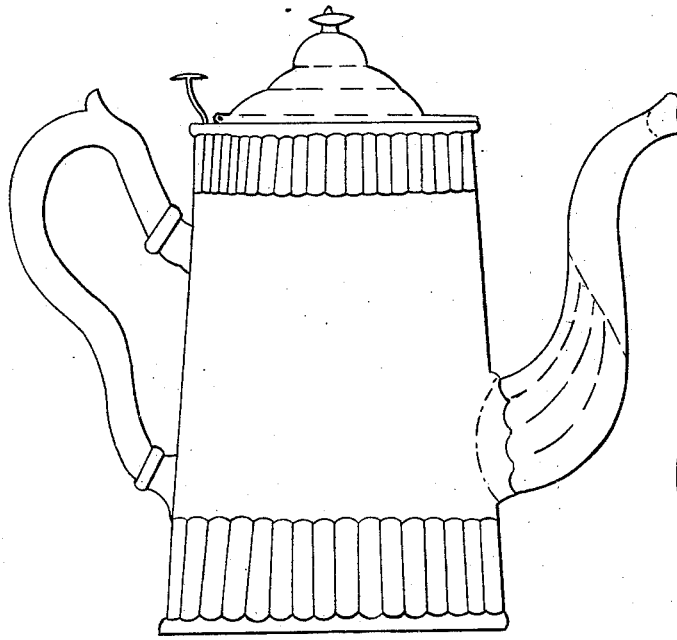
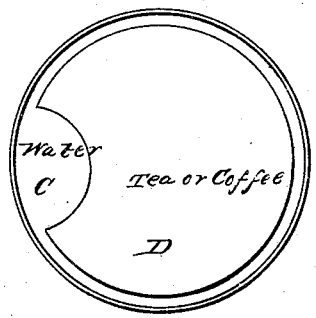
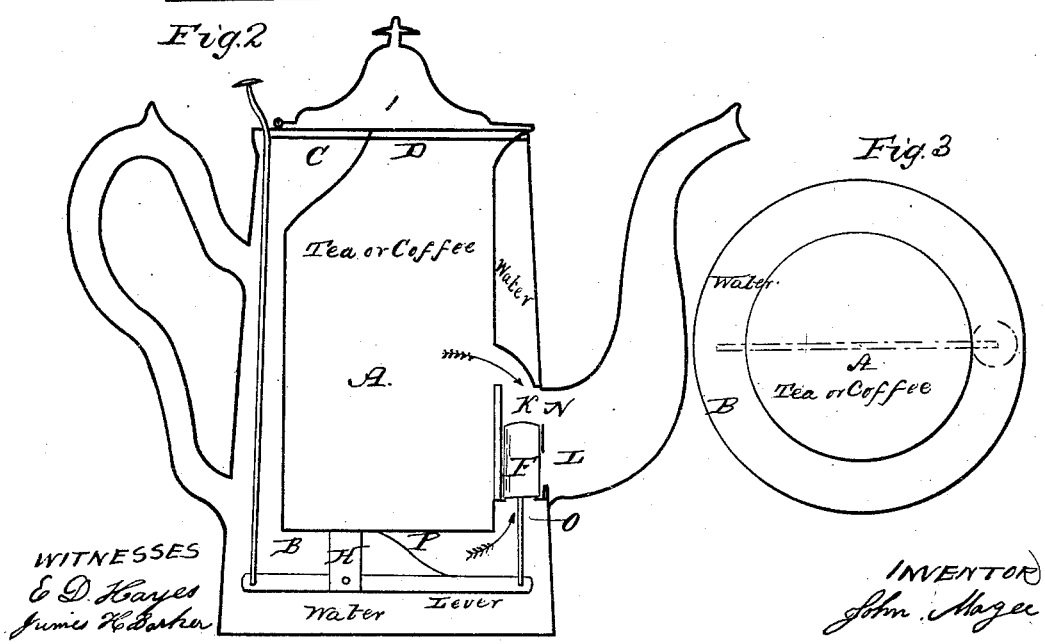
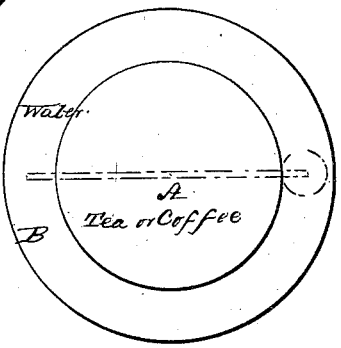
WITNESSES
E. D. Hayes
James H. Barker
INVENTOR
John Magee

UNITED STATES PATENT OFFICE.

JOHN MAGEE, OF LAWRENCE, MASSACHUSETTS.

COFFEE-POT.

Specification of Letters Patent No. 27,371, dated March 6, 1860.

*To all whom it may concern:*

Be it known that I, JOHN MAGEE, of Lawrence, in the county of Essex and Commonwealth of Massachusetts, have invented new and useful Improvements in Tea and Coffee Pots; and I do hereby declare that the following is a full and exact description of the same, reference being had to the accompanying drawings, and to letters of reference marked thereon, on which—

Figure 1, represents a tea or coffee pot. Fig. 2, represents the interior of a tea or coffee pot made the one within the other. Fig. 3, represents the bottom showing the two parts together with lever and piston. Fig. 4 represents upper end of tea or coffee pot showing tunnel C, &c.

Fig. 2, is a tea or coffee pot made in two parts, as see, A, and, B, in which, A, is the smaller and is within the larger one, or, B, and are united at top just under the lid, so that, A, is suspended within, B, the two appearing like one from outside.

E, is a thumb lever with a fulcrum, H, by the use of which the piston, F, is moved up and down in a cylinder open at both ends as at, K, and, O, with two openings in the side next the nose of the tea pot, as at, L, and, N.

The spring, P, is to draw the piston down, and to keep the cylinder closed at the lower end at all times except when the thumb power is applied to the lever, E.

Now by raising the lid of the tea or coffee pot, and pouring water into the tunnel, C, the outer part or, B, will be filled, and tea or coffee put in at, D, and fill, A, with water, when it will be allowed to steep surrounded by the water in, B. Then by pouring naturally the tea or coffee will pass out through the end of cylinder, K, and opening, N, and into tea or coffee cups until you wish to allow water to pass, then press on the thumb lever and the tea will stop, and water will pass out through the cylinder at, O, and through the opening, L, and on removing the thumb the piston will be brought down by the spring P ready to pour out tea again.

I do not claim the construction of the tea, or coffee pot, either the form, or its being made in two parts, as new; but What I do claim is—

The use of the piston F, and openings in cylinder, as applied to tea and coffee pots for the purposes above described.

JOHN MAGEE. [L. S.]

In presence of—
E. D. HAYES,
JAMES K. BARKER.